M. L. WILLIAMS AND E. G. KEMPER.
COTTON SEPARATOR.
APPLICATION FILED MAR. 14, 1919.
1,349,142.
Patented Aug. 10, 1920.
2 SHEETS—SHEET 1.
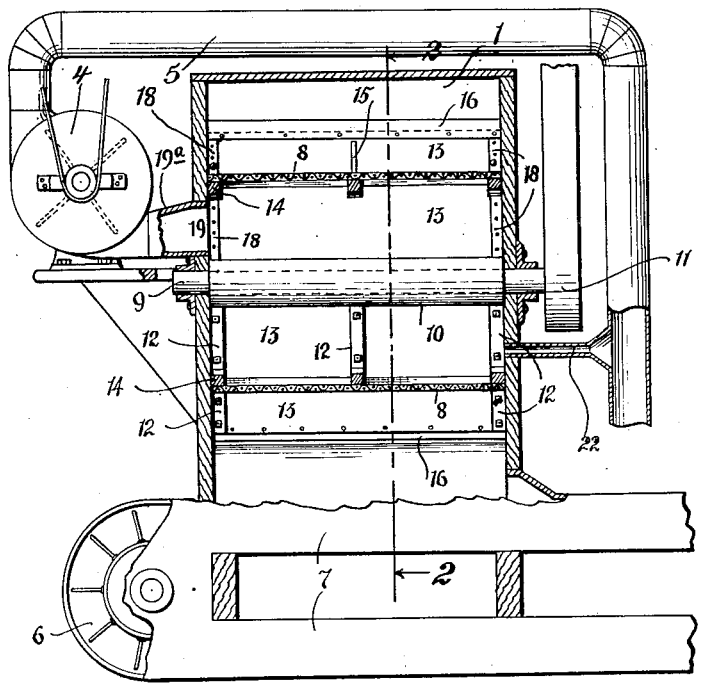
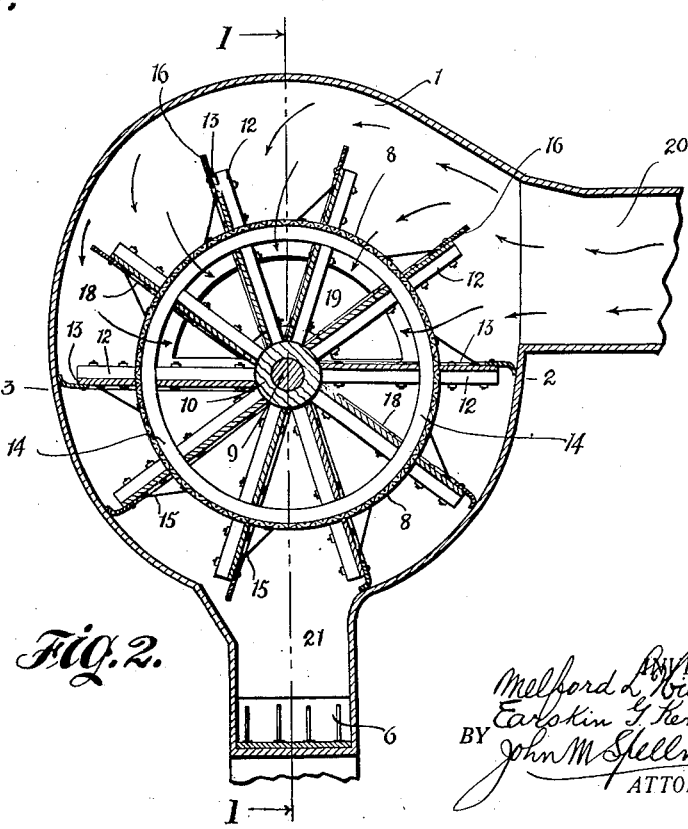

UNITED STATES PATENT OFFICE.

MELFORD L. WILLIAMS AND EARSKIN G. KEMPER, OF DALLAS, TEXAS.

COTTON-SEPARATOR.

1,349,142.  Specification of Letters Patent.  Patented Aug. 10, 1920.

Application filed March 14, 1919. Serial No. 282,643.

*To all whom it may concern:*

Be it known that we, MELFORD L. WILLIAMS and EARSKIN G. KEMPER, citizens of the United States, residing at Dallas, in the county of Dallas and State of Texas, have invented certain new and useful Improvements in Cotton-Separators, of which the following is a specification.

Our invention has relation to that class of machines known as cotton separators, that is where the cotton is drawn by atmospheric suction from the wagon into the separator and separated from the air suction prior to its entrance or delivery to the distributing means in the interior of the gin, and in such connection it relates more particularly to the arrangement and construction of such a separator.

In this class of machines as heretofore constructed more or less cotton in passing through the separator clings to the interior of the same, adhering mainly to the screen on the drum and has to be removed by hand at intervals, else it clogs up the machine. We are aware that cotton separators similar to ours have been constructed, wherein there is a combined cleaner and separator, or boll breaker and cleaner, etc., but so far as we know the construction of our separator is new.

It is the principal object of our invention to provide a cotton separator which will obviate the necessity of frequently cleaning the cotton from the machine and allow the cotton to fall into the distributer or conveyer without leaving a residue of cotton clinging to the screen drum or wall of the separator.

Another object of our invention is to provide a cotton separator which is simple in construction and operation and which is not of expensive manufacture.

We provide a casing of suitable material, having an inlet and outlet for the cotton, an opening at one end of the casing for the air suction, the casing being provided with a sectional screened drum with rubber tipped arms and ends and arranged so that the upper half of the casing is separated from the lower portion by the contact of the rubber tips against the walls of the casing. The lower side of the separator has a small opening for a pipe from the exhaust from the fan to further aid in keeping the screen drum clean.

Our invention will be more fully understood from the following description, taken in connection with the accompanying drawings forming part hereof, in which—

Figure 1 is a longitudinal sectional view of a cotton separator embodying our invention, the view taken on line 1—1 of Fig. 2.

Fig. 2 is a cross sectional view of the drum and casing, taken on line 2—2 of Fig. 1.

Fig. 3 is a detail sectional view of a portion of the drum, showing the manner of securing the brackets to the upper part of the spider.

Figure 4:
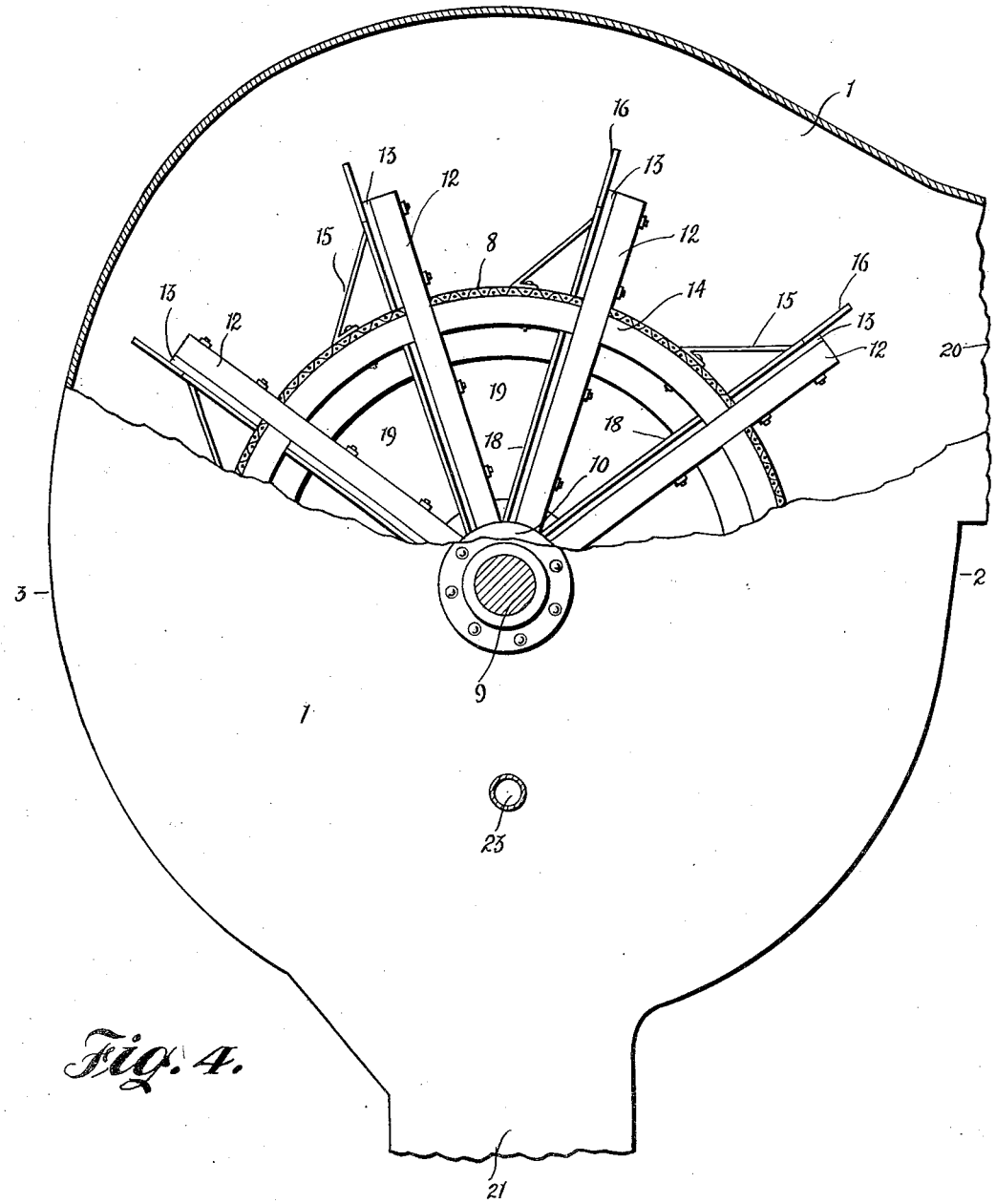
Fig. 4 is an enlarged end elevational view of the drum and casing, the casing partly broken away.

Referring to the drawings, 1 represents the casing or shell of our separator, made preferably of sheet metal, the curve of the lower portion, that is the space between the points where the rubber tips of the spider touch the inside casing walls (indicated at 2 and 3)—is concentric, while the upper portion is on the line of a larger circle. The usual form of fan is shown at 4, connected to an exhaust pipe 5 and a belt conveyer is shown at 6 inclosed in a casing 7.

Inside the metal shell 1 is arranged a screened drum 8, the drum having a shaft or axle 9 and a hub 10, on one end of which axle is attached a pulley and belt as shown at 11.

The hub has a "spider" formed by the spokes 12 radiating from the hub at each end thereof, and from the center, and bolted to the face of the spokes on the spider are boards 13 of some suitable light, strong wood. The spokes of the spider, a short distance from their outer ends are connected to the rim 14, the boards being notched so that the outer face or edge of the board and spider are flush with each other, the boards 13 extending from the hub 10 to the end of the spokes, forming a V-shaped space closed about midway by the screen 8. The spokes of the spider beyond the rim are braced by brackets 15 as shown at Fig. 3, the view taken on the center spokes of the spider.

Attached to the upper edge of the boards 13 is a strip of rubber belting 16 and similarly a strip of the same material 18 is attached to the outer edges of the spokes of the spider which radiate from each end of the hub, that is from the top of the board to the bottom, touching the hub 10.

The casing 1 has a semi-circular opening 19 in the end next to the fan connected to an air outlet 19ª from the screen, and when the fan and drum are revolved the cotton, drawn in through the inlet 20 by the suction, is pulled against the screen 8 between the V-shaped sections of the spider, and the air passes through the screen to the fan. The cotton is held against the face of the drum by the air suction until the tips 16 on the top and 18 on the sides of the spokes in the outer spiders come in contact with the walls of the casing 1 at the points 2 and 3. It will be noted that at all times there are two rubber tips or strips 16 in contact with the inside walls of the casing, separating the air completely from the cotton in the lower part of the casing. As the tips 16 are released from engagement with the walls the cotton then drops into the outlet 21 onto the conveyer 6.

By the arrangement of the sectional drum the air suction is completely shut off from the lower part of the separator or casing 1, and the screen is thus kept clean; but as an additional precaution we have arranged a small pipe 22 leading from the exhaust pipe 5 into an opening 23 in the lower part of the separator just above the periphery of the screen, the air being made to play along the screen and thus remove any cotton which might otherwise adhere thereto. A damper, not shown, is arranged in the exhaust pipe to regulate the force of air into the opening 23 through pipe 22.

Having thus described the nature and objects of our invention, what we claim as new and desire to secure by Letters Patent is—

1. The combination in a cotton separator of a casing in which is arranged a revoluble screened drum, means for creating air suction through the casing and drum, said drum having a shaft with arms radiating therefrom to provide sections, panels on said arms to form the walls between the sections, said arms and panels projecting beyond the periphery of said screen, and an opening provided in one end of the casing below the periphery of the screen and above the axis of the shaft, so arranged that the air will be drawn through the side of the screened drum and will pass out through one end thereof and through said opening in the casing, the cotton being held against the screen by air suction and delivered to a conveyer as the drum revolves.

2. In a machine for separating cotton from atmospheric suction, in combination with a casing, inlets and outlets for the air and cotton, an exhaust pipe and fan, of a sectional screened drum within the casing arranged to shut off air suction from the top thereof, and a small pipe leading from the exhaust pipe to an opening in either end of the casing, said openings adapted to admit air with or without connection to said pipe to keep the periphery of the screened drum free from adhering cotton.

In testimony whereof we have signed our names to this specification.

MELFORD L. WILLIAMS.
EARSKIN G. KEMPER.